United States Patent [19]
Pino

[11] Patent Number: 5,592,036
[45] Date of Patent: Jan. 7, 1997

[54] ENGINE CONSTRUCTION

[76] Inventor: Raul M. Pino, 153 7th St., Bethpage, N.Y. 11714

[21] Appl. No.: 276,476

[22] Filed: Jul. 18, 1994

[51] Int. Cl.$^6$ .................................................. H02K 33/16
[52] U.S. Cl. ................................................ 310/24; 310/34
[58] Field of Search ............................. 310/15, 17, 23, 310/24, 34, 35

[56] References Cited

U.S. PATENT DOCUMENTS

| | | | |
|---|---|---|---|
| 4,317,058 | 2/1982 | Blalock | 310/24 |
| 4,523,114 | 6/1985 | Smith | 310/24 |
| 5,036,930 | 8/1991 | Bisel et al. | 310/15 X |
| 5,057,724 | 10/1991 | Patton | 310/17 |
| 5,219,034 | 6/1993 | Wortham | 310/15 X |

*Primary Examiner*—Steven L. Stephan
*Assistant Examiner*—Judson H. Jones
*Attorney, Agent, or Firm*—Michael I. Kroll

[57] ABSTRACT

An improved engine construction having a reciprocating piston attached to a rotating crankshaft contains, proximate the piston head, a permanent magnet. A cylinder, confining the piston, has a head with an electromagnet located therein. A timed switching system reverses the polarity of the electromagnet, thus alternately attracting and repelling the piston and driving the attached rotating crankshaft.

1 Claim, 2 Drawing Sheets

ENGINE CONSTRUCTION

BACKGROUND OF THE INVENTION

1. Field of the Invention

The present invention relates to a rotary engine construction. More specifically, it relates to an improved engine construction that provides a source of power with less noise and minimal emissions. Even more specifically, it relates to an engine construction wherein the impelling of a piston is accomplished by the timed switching of an electromagnet located in a cylinder head from a positive to a negative polarity to react oppositely with a permanent magnet mounted in the piston head.

The field most likely to benefit from the improved engine of the instant invention is the transportation industry. Vast quantities of petrochemical energy are consumed in transporting goods and personnel and the detrimental effects on the planet are becoming apparent. The instant invention eliminates the need to burn petrochemicals in the transport vehicle.

In a more general sense, any field requiring a clean source of rotary mechanical energy is a potential benefactor from the advantages of this invention. The Environmental Protection Agency has recently identified gasoline powered lawnmowers as a substantial contributor to environmental atmospheric pollution. The instant invention would be ideally suited to powering a lawn mower without creating pollution.

Thus it can be seen that the potential fields of use for this invention are myriad, and the particular preferred embodiment described herein is in no way meant to be limiting the particular field chosen for exposition of the details of the invention.

2. Description of the Prior Art

Various methods of energy transformation, to convert more intangible forms of stored energy into physical work, have been used over the centuries. External combustion engines convert the stored chemical energy of wood or coal into heat used to create vapor or steam pressure, providing motive force. Internal combustion engines convert solar energy, entombed in petrochemical substances, into metered explosions to drive pistons attached to crankshafts, or other related force transmitting arrangements. These are common and well known devices that have revolutionized industrial operations and personal lifestyles. A universal drawback of these art devices is the venting to the atmosphere of the by-products of combustion inherent in their operation. As civilization expands, the health hazards, let alone the threat to the biosphere of the planet, become more and more weighty in both national and international councils and debates. A need clearly exists for a form of power conversion that eliminates or minimizes these hazardous, noxious emissions.

The present invention seeks to address these concerns by providing an improved engine construction that substantially eliminates emissions, and additionally provides almost soundless operation.

None of the known prior art, taken either singly or in combination, is seen to describe the instant invention as claimed.

SUMMARY OF THE INVENTION

The present invention is an improved engine construction wherein the piston attached to the crankshaft contains, proximate the piston head, a permanent magnet. The cylinder head has an electromagnet located therein with a timed switching system to reverse the polarity of the electromagnet, thus alternately attracting and repelling the piston.

Accordingly, it is a principal object of the invention to provide a new and improved engine construction which overcomes the disadvantages of the prior art in a simple but effective manner.

It is a further object of the invention to provide an improved engine construction having a piston crank mechanism wherein the rotary impulse provided to the crank is effectively doubled by virtue of the fact that the driving force for the piston acts in both directions.

It is a further object of the invention to provide an improved engine construction wherein the driving force for the piston is electromagnetic in nature.

It is another object of the invention to provide an improved engine construction wherein an electromagnet located proximate the cylinder head switches polarity in a regulated fashion, thus alternately attracting and repelling the permanent magnet located proximate the piston head.

It is yet a further object of the invention to provide an improved engine construction wherein the operation of the engine produces minimal or no emissions.

Still another object of the invention is to provide an improved engine construction that is substantially vibration free in operation.

Still another object of the invention is to provide an improved engine construction that is relatively quiet in operation by virtue of the fact that there are no confined explosions to be dealt with.

Still another object of the invention is to provide an improved engine construction that requires no valves or porting of gases or fluids for its operation.

It is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

Similar reference characters denote corresponding features consistently throughout the attached drawings.

DETAILED DESCRIPTION OF THE PREFERRED EMBODIMENT

Figure 1:
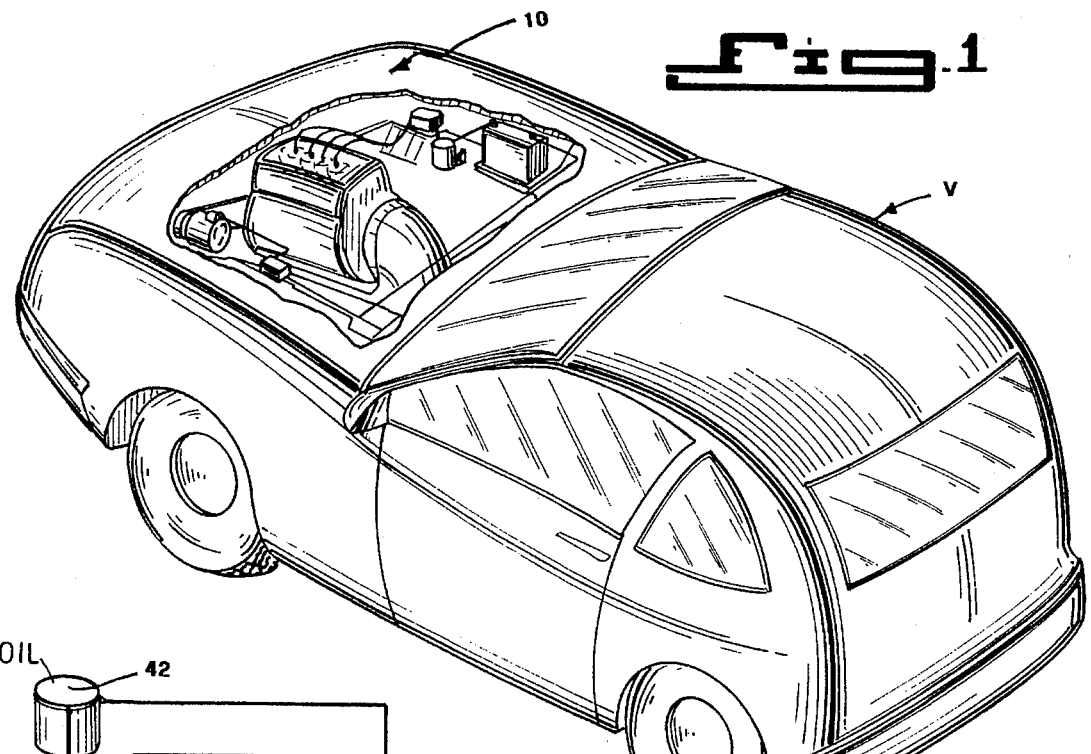
FIG. 1 is an environmental partially cutaway perspective view of the improved engine construction mounted in a conventional vehicle.
Figure 2:
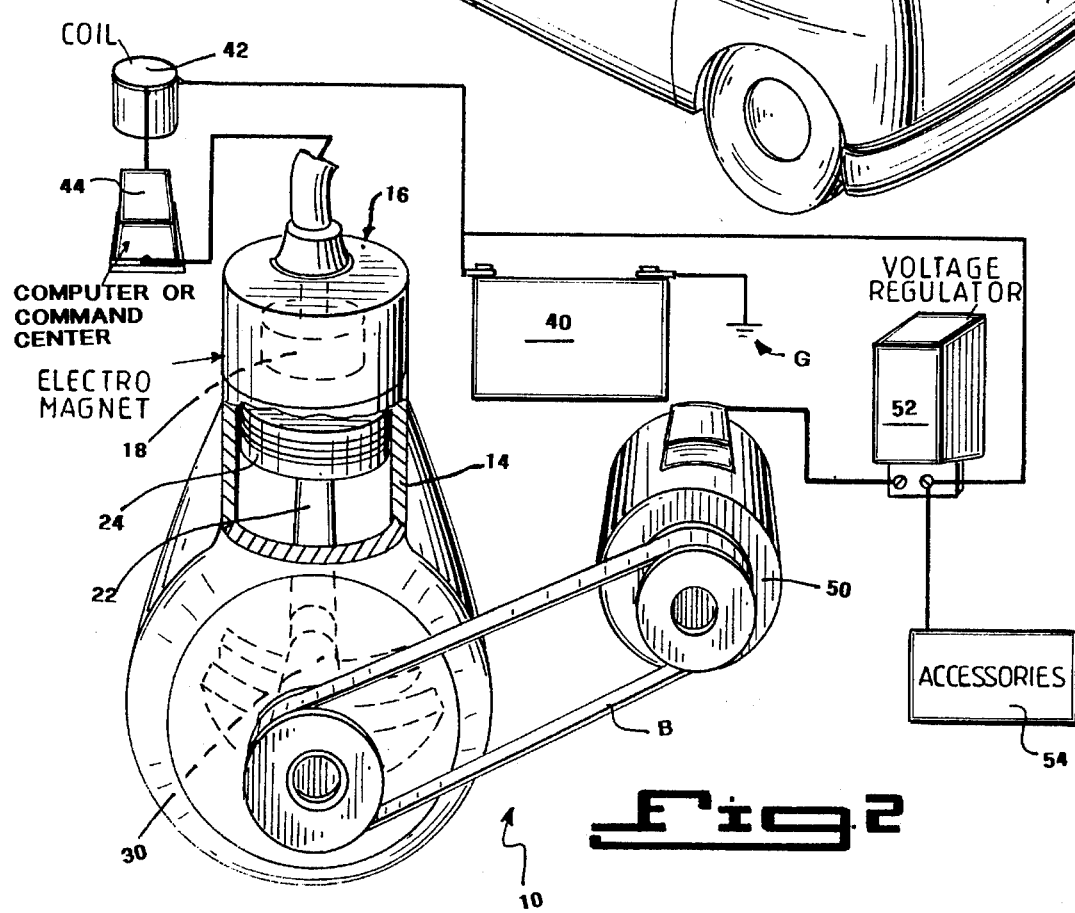
FIG. 2 is a stylized schematic view of the improved engine construction showing the interrelation of the various parts.
Figure 3:
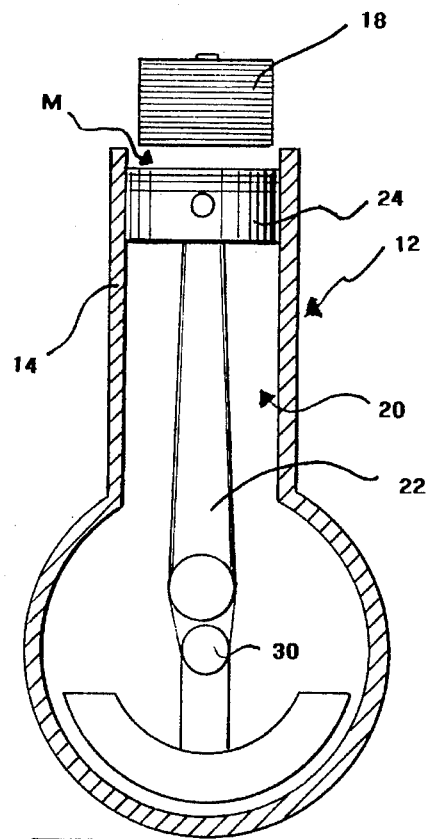
FIG. 3 is a cutaway view of a cylinder in the present invention with the piston at top dead center; i.e. at its closest point to the electromagnet proximate the cylinder head.

The present invention is shown in its entirety in FIGS. 1 and 2 and is indicated generally at 10. In FIG. 1 it is shown placed within a vehicle V, however, it should be noted that the improved engine construction 10 could be used in a wide variety of applications, such as power generating plants, home or commercial heating systems, water craft, aircraft of either fixed or rotary wing construction, lawnmowers, motorcycles, and like devices. The improved construction 10 has a cylinder 12 which includes cylinder walls 14 and a cylinder head 16. Located in or proximate to the cylinder head 16 is an electromagnet 18 which will be discussed more fully hereinafter. Contained within the cylinder 12 is a piston 20 that includes a piston shaft 22 and a piston head 24. The piston head 24 is a fixed magnet M with a predetermined polarity. The piston shaft 22 is attached in a well known manner to a reciprocating crankshaft 30 (as seen best seen in FIGS. 3–6). It should be emphasized that any number of cylinders 12 could be utilized in the operation of the improved engine construction 10 with the usual placement and cooperation of the cylinders 12 along the crankshaft 30. For the purposes of elucidation, only one cylinder 12 will be discussed in this specification.

Figure 4:
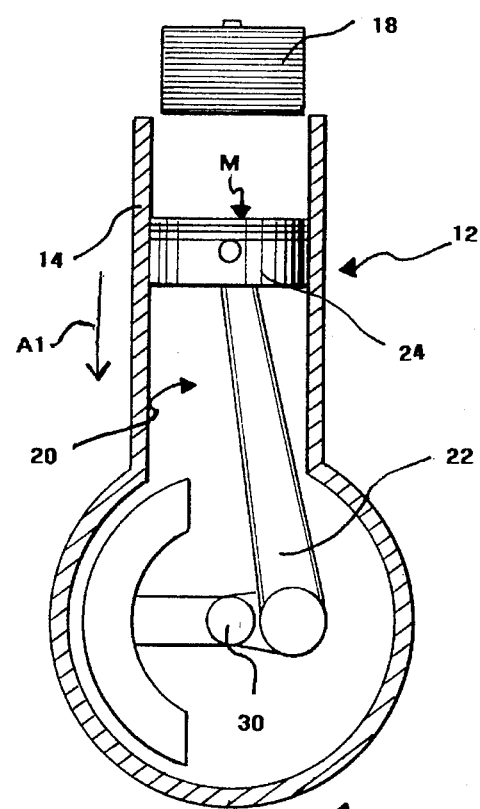
FIG. 4 is a cutaway view of a cylinder in the present invention with the piston moving downwardly, being repelled by the electromagnet in the cylinder head.
Figure 5:
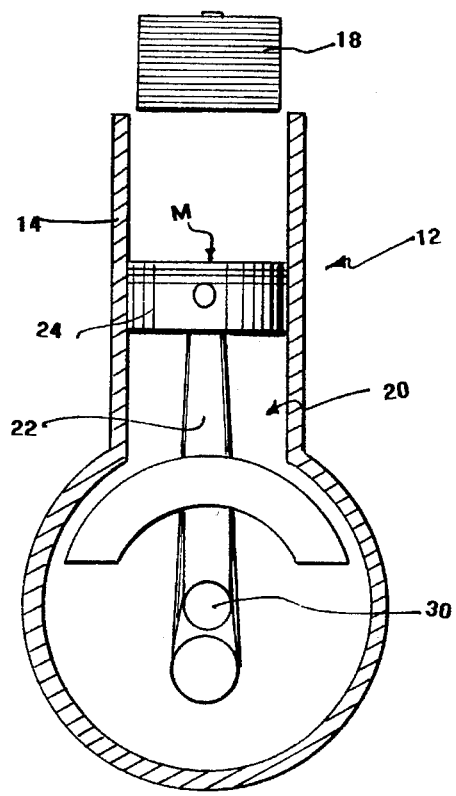
FIG. 5 is a cutaway view of a cylinder in the present invention with the piston at bottom dead center in its stroke, during which time the electromagnet would be switching polarity to attract the permanent magnet in the piston head.
Figure 6:
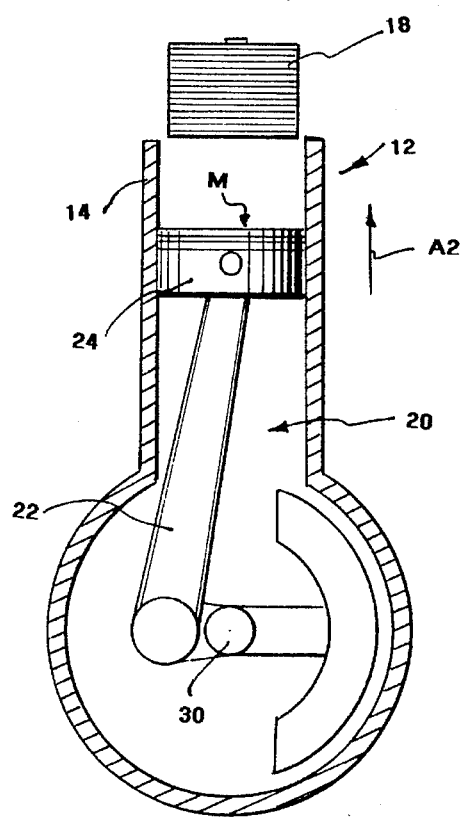
FIG. 6 is a cutaway view of a cylinder in the present invention with the piston being shown moving upwardly to the extended position of the stroke, being now attracted by the electromagnet in the cylinder head.

Power is initially supplied to the engine 10 from a power pack 40, best seen in FIG. 2. This could be any variety of electrical energy supplying devices, such as a high capacity batteries, Oxygen/Hydrogen fuel cells, or similar apparatus. The power pack is attached to a ground G, shown schematically in FIG. 2. When the coil 42 is activated, power flows from the source 40, through the coil 42 and is regulated and delivered by an electronic control system 44. The control system 44 could be hardwired, as in a traditional distributor, or it could be controlled by a microprocessor. Through this control system 44, power is delivered to the electromagnet 18 located in the cylinder head 16. The polarity of the electromagnet 18 is thus determined and controlled. Mounted in the piston head 24 is a permanent magnet portion M. This magnet portion M is positioned such that a predetermined polarity is presented towards the electromagnet 18. Thus, by controlled switching of the electromagnet's polarity by control system 44, the piston head 24 is alternately attracted and repelled by the electromagnet 18. This operation is clearly seen in FIGS. 3–6 where the repelling stroke is illustrated in FIG. 4 by directional arrow A1 and the attracting stroke is illustrated in FIG. 6 by directional arrow A2. Thus, the crankshaft 30 rotates, supplying motive power to whatever application that the engine 10 is employed in. As mentioned above, these various applications are myriad.

Turning to FIG. 2 it can be seen that attached to the crankshaft 30 is a power takeoff means, shown here as a belt B, that serves to transmit rotational torque to an alternator 50. The alternator 50 is, in turn, connected to a voltage regulator 52 that supplies power both to various accessories 54, and back to the power source 40. The accessories that could be powered by the alternator 50 could be such apparatus (in the vehicle application shown in FIG. 1) as air conditioners, radios, sound systems, windshield wipers, lights, and the like. Following hereafter is a list of the elements discussed in this specification:

| | |
|---|---|
| engine construction | 10 |
| vehicle | V |
| cylinder | 12 |
| cylinder walls | 14 |
| cylinder head | 16 |
| electromagnet | 18 |
| piston | 20 |
| piston shaft | 22 |
| piston head | 24 |
| fixed magnet portion | M |
| reciprocating crankshaft | 30 |
| power pack | 40 |
| ground | G |
| coil | 42 |
| electronic control system | 44 |
| directional arrow | A1 |
| directional arrow | A2 |
| belt | B |
| alternator | 50 |
| voltage regulator | 52 |
| accessories | 54 |

Although the engine shown has only a single cylinder driving a single throw crankshaft, it is to be understood that additional cylinders may be placed about or along a multiple throw crank shaft so as to produce a more powerful version of the invention. Further improvements could be made such as providing a means to control the intensity, as well as the direction, of the electromagnetic field. These modifications are considered within the realm of the ordinary artisan and are intended to be encompassed within the scope of my claims.

In other words, it is to be understood that the present invention is not limited to the sole embodiment described above, but encompasses any and all embodiments within the scope of the following claims.

I claim:

1. An improved engine comprising:

at least one cylinder, said cylinder having walls and a cylinder head comprising an electromagnet forming a part of and completely closing off the top of said cylinder;

a piston disposed within said cylinder walls comprising a solid cylindrical permanent magnet, said magnet mounted for reciprocation within said cylinder, and a rod extending from said permanent magnet connected to drive a crankshaft;

power means for supplying electrical power to said electromagnet;

power control means for selectively switching the polarity of said electromagnet to alternatively attract and repel said permanent magnet causing said permanent magnet to reciprocate within said cylinder, so as to provide a positive force on said piston during both directions of movement, said rod rotating said crankshaft; and belt means driven by said crankshaft to deliver power output of said engine.

\* \* \* \* \*